(12) United States Patent
Shiraishi

(10) Patent No.: US 7,997,739 B2
(45) Date of Patent: Aug. 16, 2011

(54) OPTICAL BEAM SCANNING DEVICE, IMAGE FORMING APPARATUS

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/822,534

(22) Filed: Jun. 24, 2010

(65) Prior Publication Data
US 2010/0259808 A1 Oct. 14, 2010

Related U.S. Application Data

(63) Continuation of application No. 11/773,497, filed on Jul. 5, 2007, now Pat. No. 7,766,491.

(51) Int. Cl.
G02B 26/10 (2006.01)
G03B 21/28 (2006.01)

(52) U.S. Cl. ............... 353/99; 359/204.1; 359/216.1; 399/179; 347/243; 250/236

(58) Field of Classification Search ............ 353/98, 353/99; 399/178, 179, 200; 250/234–236; 359/201.1, 204.1, 205.1, 216.1, 219.2; 347/232, 347/233, 243, 260
See application file for complete search history.

(56) References Cited

U.S. PATENT DOCUMENTS

| 7,766,491 B2 * | 8/2010 | Shiraishi ................ 353/99 |
| 2009/0073531 A1 | 3/2009 | Imai |
| 2009/0295900 A1 | 12/2009 | Ichii |

FOREIGN PATENT DOCUMENTS

| JP | 11-218991 | 8/1999 |
| JP | 2000-002846 | 1/2000 |

* cited by examiner

Primary Examiner — Kevin Pyo
(74) Attorney, Agent, or Firm — Turocy & Watson, LLP

(57) ABSTRACT

An optical beam scanning device includes a polygon mirror 80 in which tilt angles with respect to a rotation axis of the polygon mirror 80 of respective plural reflecting surfaces are set to angles corresponding to photoconductive members associated with the respective reflecting surfaces, a post-deflection optical system A1 that guides light beams reflected and deflected by the respective plural reflecting surfaces in the polygon mirror 80 to the photoconductive surfaces of the photoconductive members corresponding to the respective reflecting surfaces, and a pre-deflection optical system 7a that shapes the light from the light source to be a light beam of a predetermined sectional shape and guides the light beam to the polygon mirror 80, the pre-deflection optical system 7a guiding the light from the light source to the polygon mirror 80 through an optical path that passes, in the main scanning direction, on an optical axis of the post-deflection optical system A1 and passes, in the sub-scanning direction, a position further apart from the optical axis of the post-deflection optical system A1 than all light beams after reflection and deflection guided by the post-deflection optical system A1.

14 Claims, 12 Drawing Sheets

OPTICAL BEAM SCANNING DEVICE, IMAGE FORMING APPARATUS

CROSS-REFERENCE TO RELATED APPLICATIONS

This application is a Continuation of application Ser. No. 11/773,497 filed on Jul. 5, 2007, the entire contents of which are incorporated herein by reference.

BACKGROUND OF THE INVENTION

1. Field of the Invention

The present invention relates to an optical beam scanning device that causes a light beam from a light source to scan in a main scanning direction on photoconductive surfaces of photoconductive members, and, more particularly to a technique for realizing improvement of an optical characteristic.

2. Description of the Related Art

Conventionally, there is known a technique for, in image forming apparatuses that perform image formation of electrostatic latent images and the like on photoconductive members according to irradiation of light beams, setting plural reflecting surfaces in a rotating deflector, which performs scanning of light beams on plural photoconductive members, to have different tilt angles with respect to a rotation axis and causing the light beams to perform scanning of different photoconductive members for each of the reflecting surfaces having the different tilt angles (see JP-A-2000-2846 and JP-A-11-218991).

In a pre-deflection optical system in the conventional technique, a ray is made incident from the outside of a scanning range of a post-deflection optical system. In the conventional optical beam scanning device having such as constitution, there is a problem in that, when it is attempted to adopt an overfilled optical system advantageous for an increase in speed, it is difficult to keep main scanning direction beam diameters (which affect uniformity of quantities of light) uniform and an optical characteristic is not stabilized.

SUMMARY OF THE INVENTION

It is an object of an embodiment of the present invention to provide a technique that can contribute to improvement of an optical characteristic of an optical beam scanning device while realizing an increase in scanning speed of a light beam.

In order to solve the problem, an optical beam scanning device according to an aspect of the invention is an optical beam scanning device that is capable of causing light from a light source to scan in a main scanning direction on photoconductive surfaces of respective plural photoconductive members, the optical beam scanning device characterized by including a rotating deflector that reflects and deflects an incident light beam with plural reflecting surfaces arrayed in association with the respective plural photoconductive members in a rotating direction to thereby cause the incident light beam to scan in the main scanning direction, tilt angles with respect to a rotation axis of the rotating deflector of the respective plural reflecting surfaces being set to angles corresponding to the photoconductive members associated with the respective reflecting surfaces, a post-deflection optical system that guides light beams reflected and deflected by the respective plural reflecting surfaces in the rotating deflector to the photoconductive surfaces of the photoconductive members corresponding to the respective reflecting surfaces, and a pre-deflection optical system that shapes the light from the light source to be a light beam of a predetermined sectional shape and guides the light beam to the rotating deflector, the pre-deflection optical system guiding the light from the light source to the rotating deflector through an optical path that passes, in the main scanning direction, on an optical axis of the post-deflection optical system or near the optical axis and passes, in the sub-scanning direction, a position further apart from the optical axis of the post-deflection optical system than all light beams after reflection and deflection guided by the post-deflection optical system.

An optical beam scanning device according to another aspect of the invention is an optical beam scanning device that is capable of causing light from a light source to scan in a main scanning direction on photoconductive surfaces of respective plural photoconductive members, the optical beam scanning device characterized by including light beam deflecting means for reflecting and deflecting an incident light beam with plural reflecting surfaces arrayed in association with the respective plural photoconductive members in a rotating direction to thereby cause the incident light beam to scan in the main scanning direction, tilt angles with respect to a rotation axis of the light beam deflecting means of the respective plural reflecting surfaces being set to angles corresponding to the photoconductive members associated with the respective reflecting surfaces, post-deflection light guiding means for guiding light beams reflected and deflected by the respective plural reflecting surfaces in the light beam deflecting means to the photoconductive surfaces of the photoconductive members corresponding to the respective reflecting surfaces, and pre-deflection light guiding means for shaping the light from the light source to be a light beam of a predetermined sectional shape and guiding the light beam to the light beam deflecting means, the pre-deflection light guiding means guiding the light from the light source to the light beam deflecting means through an optical path that passes, in the main scanning direction, on an optical axis of the post-deflection light guiding means or near the optical axis and passes, in the sub-scanning direction, a position further apart from the optical axis of the post-deflection light guiding means than all light beams after reflection and deflection guided by the post-deflection light guiding means.

An image forming apparatus according to still another aspect of the invention is characterized by including the optical beam scanning device having the structure described above, a photoconductive member on which an electrostatic latent image is formed by a light beam caused to scan by the optical beam scanning device, and a developing unit that visualizes the electrostatic latent image formed on the photoconductive member.

DESCRIPTION OF THE EMBODIMENTS

First Embodiment

A first embodiment of the present invention will be hereinafter explained with reference to the drawings.

Figure 1:
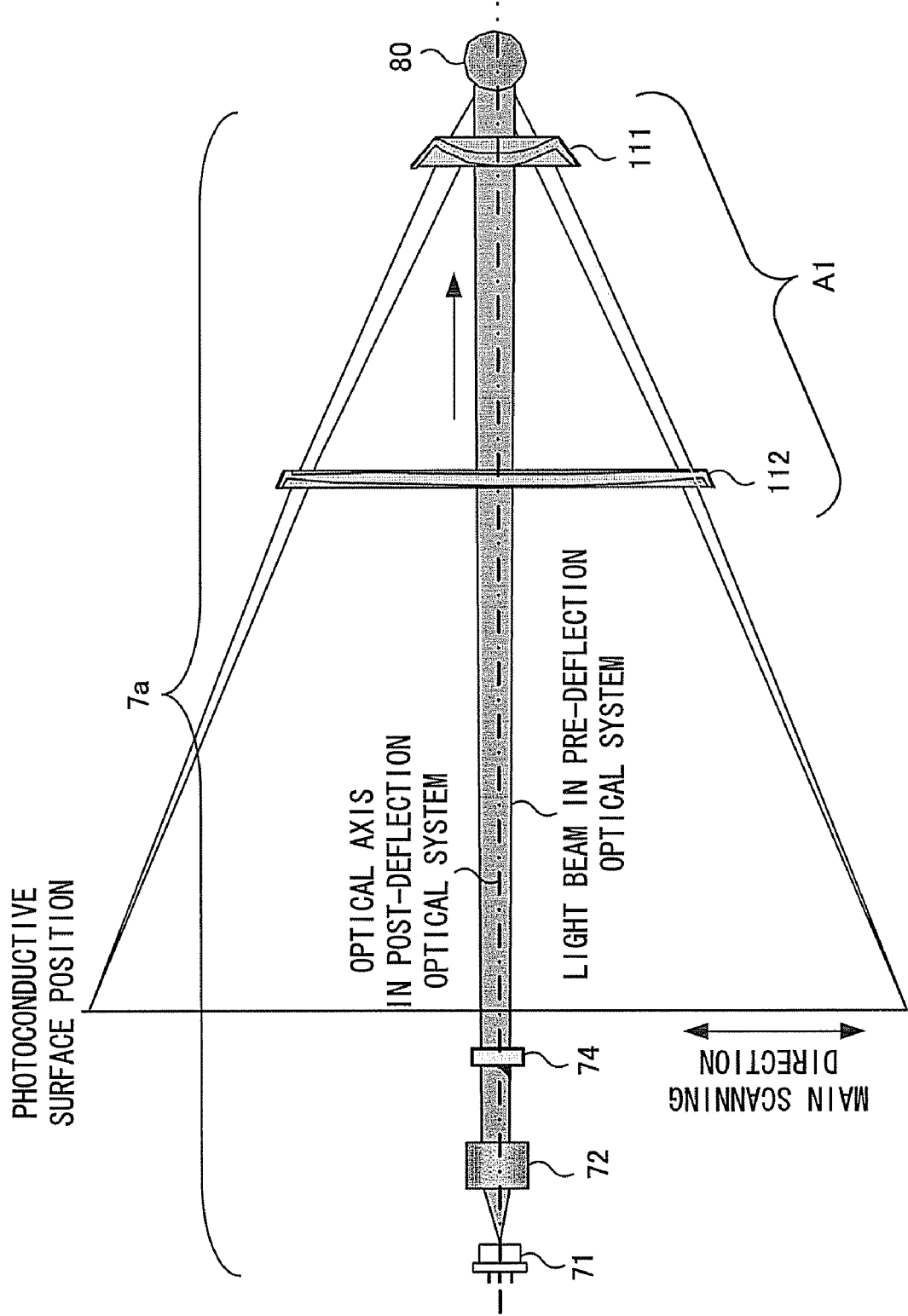
FIG. 1 is a plan view showing a structure of an optical system of an optical beam scanning device according to a first embodiment of the invention in a state in which folding by a fold mirror is developed.
Figure 2:
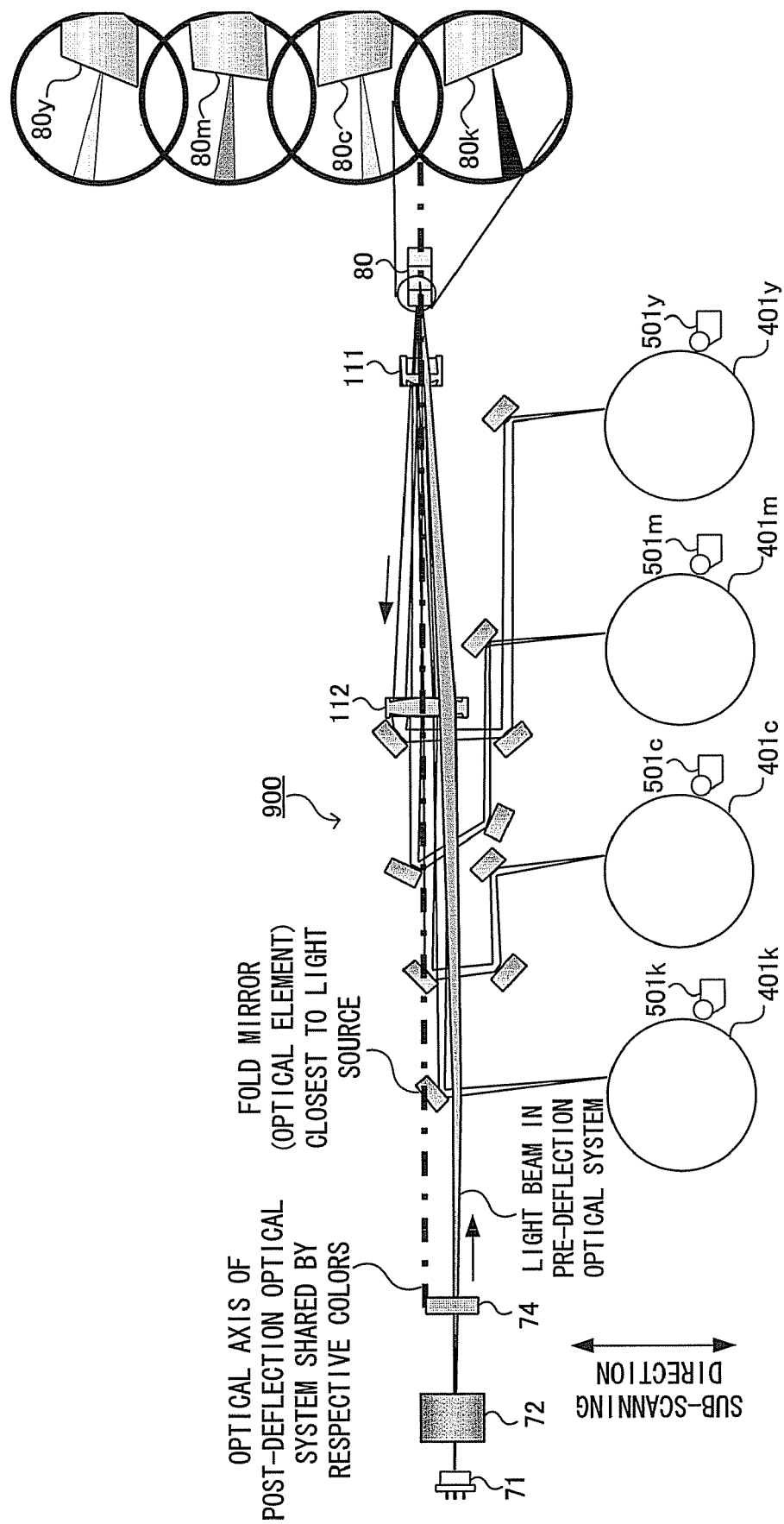
FIG. 2 is a sectional view in a sub-scanning direction showing a schematic structure of an image forming apparatus 900 including the optical beam scanning device according to the first embodiment of the invention.

FIG. 1 is a plan view showing a structure of an optical system of an optical beam scanning device according to the first embodiment of the invention in a state in which folding by a fold mirror is developed. FIG. 2 is a sectional view in a sub-scanning direction showing a schematic structure of an image forming apparatus 900 including the optical beam scanning device according to the first embodiment of the invention.

As shown in FIGS. 1 and 2, the optical beam scanning device according to this embodiment includes a pre-deflection optical system (pre-deflection light guiding means) 7a, a polygon mirror (a rotating deflector, light beam deflecting means) 80, and a post-deflection optical system (post-deflection light guiding means) A1.

The optical beam scanning device has a role of causing a light beam from a light source 71 to scan in a main scanning direction on photoconductive surfaces of respective plural photoconductive members 401y to 401k. Electrostatic latent images are formed on the photoconductive surfaces of the photoconductive members 401y to 401k by the light beam caused to scan by the optical beam scanning device. The electrostatic latent images formed on the respective photoconductive members are visualized by developing units 501y to 501k using developing agents of colors corresponding to the respective photoconductive members.

Details of the optical beam scanning device according to this embodiment will be explained.

The polygon mirror 80 reflects and deflects an incident light beam with plural reflecting surfaces 80y to 80k arrayed in association with the respective plural photoconductive members 401y to 401k in a rotating direction to thereby cause the incident light beam to scan in the main scanning direction. Tilt angles with respect to a rotation axis of the polygon mirror 80 of the respective plural reflecting surfaces 80y to 80k of the polygon mirror 80 are set to angles corresponding to the photoconductive members associated with the respective reflecting surfaces. In such a structure, the number of reflecting surfaces of the polygon mirror 80 is integer times as large as the number of colors. Here, since four colors of yellow (401y), magenta (401m), cyan (401c), and black (401k) are used, the number of reflecting surfaces of the polygon mirror 80 is a multiple of 4 (4, 8, 12, . . . ).

The pre-deflection optical system 7a includes a light source 71 made of an LD array having four light sources arranged in positions different from one another in a sub-scanning direction (a rotation axis direction of the polygon mirror) orthogonal to the main scanning direction and capable of blinking independently from one another, an infinite focus lens (or a collimator lens) 72 that changes a diverging ray from the light source 71 to a convergent ray, a parallel ray, or a gentle diffused ray, and a cylinder lens 74, an fθ 1 lens 111, and an fθ 2 lens 112 for condensing a light beam near the polygon mirror 80.

With such a structure, the pre-deflection optical system 7a shapes light from the light source 71 to be, for example, a light beam of a predetermined sectional shape long in the main scanning direction to guide the light beam to the polygon mirror 80 and condenses the light beam in the sub-scanning direction near the reflecting surfaces of the polygon mirror 80.

The post-deflection optical system A1 is formed of a resin material such as plastics and includes the fθ 1 lens 111 and the fθ 2 lens 112 that have free-form surfaces of a power distribution in which power changes continuously and optical elements such as a fold mirror shown in FIG. 2. In this way, in this embodiment, the fθ 1 lens 111 and the fθ 2 lens 112 are used in both the optical systems of the pre-deflection optical system 7a and the post-deflection optical system A1 and give power to both a light beam guided by the pre-deflection optical system 7a and a light beam guided by the post-deflection optical system A1.

If the fθ 1 lens 111 and the fθ 2 lens 112 are not used in the pre-deflection optical system, when a light beam is guided from the light source to the polygon mirror 80 by the pre-deflection optical system, the light beam needs to pass an optical path that avoids the fθ 1 lens 111 and the fθ 2 lens 112. However, in order to realize the optical path that avoids the fθ 1 lens ill and the fθ 2 lens 112 described above, it is necessary to make the light beam incident on the polygon mirror 80 at an angle substantially tilted with respect to an optical axis. This is not preferable when occurrence of a wave aberration is taken into account.

On the other hand, as in this embodiment, if the fθ 1 lens 111 and the fθ 2 lens 112 are used in the pre-deflection optical system as well, when a light beam is guided from the light source to the polygon mirror 80, it is possible to make the light beam incident on a deflection surface at an angle closer to the optical axis. Thus, it is possible to contribute to control a wave aberration, a reduction in a device size in the sub-scanning direction, and a reduction in the number of components.

With such a structure, the post-deflection optical system A1 guides light beams reflected and deflected by the respective plural reflecting surfaces 80y to 80k in the polygon mirror 80 to the photoconductive surfaces of the photoconductive members 401y to 401k corresponding to the respective reflecting surfaces through optical paths different from one another. The post-deflection optical system A1 in this context is constituted to guide, for example, after principal rays of light beams at both ends in the sub-scanning direction among plural light beams guided by the post-deflection optical system A1 pass the fθ 1 lens 111 and the fθ 2 lens 112, light beams reflected and deflected by the respective plural reflecting surfaces in the polygon mirror 80 to the photoconductive surfaces of the photoconductive members corresponding to the respective reflecting surfaces through optical paths that pass an upper side and a lower side of an optical axis of the fθ 1 lens 111 and the fθ 2 lens 112 in the sub-scanning direction.

In this embodiment, since the polygon mirror 80 has eight reflecting surfaces, when one light beam is made incident on the polygon mirror, it is possible to write color information of four colors in the respective photoconductive members twice as the polygon mirror 80 rotates once. Here, a so-called "multi-beam optical system" in which the light source 71 emits four light beams for forming electrostatic latent images on the photoconductive surfaces independently from one another is adopted. Thus, it is possible to write color information of four colors for eight lines (four lines×2) at a time in the respective photoconductive members as the polygon mirror 80 rotates once.

Since light sources combined into one array are used for image formation processing of primary colors (black, cyan, magenta, and yellow) corresponding to the respective photoconductive members as well, it is possible to reduce the number of optical components, realize a reduction in cost, and realize a reduction in an arrangement space. When one light source is provided for each of the photoconductive members, in order to form latent images for four colors, it is necessary to increase the number of revolutions of a polygon mirror and a driving frequency of an LD by fourfold and it is difficult to increase speed of the image formation processing and realize high definition of an image. However, in this embodiment, since the multi-beam optical system is adopted, it is possible to increase speed of formation of an electrostatic latent image on a photoconductive drum without excessively increasing the number of revolutions of the polygon mirror and the driving frequency of the LD. Compared with a case in which plural light sources such as LDs are arranged in positions different from one another, it is possible to prevent occurrence of adjustment errors and the like of the arrangement positions of the light sources and contribute to improvement of an optical characteristic.

Curvatures of the fθ 1 lens 111 and the fθ 2 lens 112 independently change in two directions of the main scanning direction and the sub-scanning direction. The fθ 1 lens 111 and the fθ 2 lens 112 in this context are equivalent to a shared optical element. Power distributions of the respective fθ 1 lens 111 and fθ 2 lens 112 are set as power distributions that give power to all light beams reflected and deflected by the polygon mirror 80 and guided to the respective plural photoconductive members 401y to 401k (all light beams reflected and deflected by the respective plural reflecting surfaces) according to positions of incidence of the light beams such that the light beams guided to the photoconductive surfaces by the post-deflection optical system A1 have a predetermined optical characteristic (e.g., a characteristic that satisfies predetermined conditions concerning a beam diameter of a light beam, a degree of bending of a scanning line, a position of the light beam with respect to a scanning range, and the like) on the photoconductive surfaces. In this way, the shared optical element has a smooth lens surface that acts on all the light beams reflected and deflected by the respective plural reflecting surfaces in the polygon mirror 80.

As described above, by combining a part of the optical elements conventionally provided independently for each of the photoconductive members into the shared optical element and giving power to all the light beams, which should be guided to the plural photoconductive members, with the shared optical element, it is possible to contribute to a reduction in an arrangement space of optical components in the sub-scanning direction. Since it is possible to reduce the number of optical components that should be arranged, it is possible to prevent deterioration in an optical characteristic due to arrangement errors and the like of the respective optical components and also contribute to a reduction in cost.

By combining a part of the optical elements independently provided for each of the photoconductive members into the shared optical system, it is possible to set tilt angles of the respective reflecting surfaces of the polygon mirror to small angles and reduce an arrangement space in the sub-scanning direction of the optical system. Further, it is possible to control occurrence of an asymmetrical wave aberration that increases when the tilt angles of the reflecting surfaces of the polygon mirror are large and realize improvement of a focusing characteristic as well. Moreover, by applying the optical beam scanning device of such a structure to an image forming apparatus, it is possible to contribute to a reduction in size of the image forming apparatus and stabilization of an image quality in image formation processing.

The "predetermined optical characteristic" in this context means an optical characteristic desirable in forming electrostatic latent images on the photoconductive surfaces of the photoconductive member. By condensing an incident light beam from the pre-deflection optical system to the polygon mirror near the reflecting surfaces (setting the incident light in a conjugate relation in the sub-scanning direction on the reflecting surfaces of the polygon mirror and on the photoconductive surfaces of the photoconductive members), a shift of a beam position in the sub-scanning direction due to tilts of the respective reflecting surfaces of the polygon mirror is controlled (surface toppling correction).

In this embodiment, the shared optical element is formed by the two fθ lenses. However, the invention is not limited to this. The shared optical element may be formed by, for example, three or more lenses. By forming the shared optical element with plural lenses in this way, compared with the case in which the shared optical element is formed by one lens, it is possible to set curvatures of lens surfaces of the respective lenses gentle, machining becomes easy, and it is possible to contribute to a reduction in manufacturing cost and improvement of machining accuracy.

In this embodiment, a continuously changing power distribution is set for both planes of incidence and planes of exit of the respective fθ 1 lens and fθ 2 lens. However, it is not always necessary to set such a power distribution for all the lens surfaces of the shared optical element. In general, when the shared optical element is formed by the plural lenses in this way, lenses located on a downstream side in a light beam traveling direction often have larger sizes. In other words, since light beams made incident on the lenses on the downstream side in the light beam traveling direction have smaller beam diameters and have large moving distances of the light beams at the same oscillating angle compared with lenses located on an upstream side, it is considered that there is a significant effect in setting the continuously changing power distribution as described above. Thus, when the shared optical element described above is formed by the plural lenses, it is preferable to give continuously changing power described above to the side of the plane of exit of the lens located on the most downstream side in the light beam traveling direction (i.e., a side closest to an image surface).

It goes without saying that it is also possible to combine the fθ 1 lens 111 and the fθ 2 lens 112 into one fθ lens (shared optical element). Consequently, it is possible to reduce the number of components of the optical system and contribute to a reduction in cost compared with the structure in which the two fθ lenses are used.

A structure of the entire optical system in the optical beam scanning device according to this embodiment and a relation between the pre-deflection optical system 7a and the post-deflection optical system A1 will be explained in detail.

The optical beam scanning device according to this embodiment constitutes a so-called "overfilled optical system". The "overfilled optical system" is an optical system that makes a light beam wider than the respective reflecting surfaces of the polygon mirror incident on the polygon mirror and uses the reflecting surfaces as substantial apertures (stops) in the main scanning direction. By adopting such an "overfilled optical system", it is possible to increase the number of surfaces of the polygon mirror without increasing a size thereof and contribute to an increase in speed compared with an "underfilled optical system" that makes a light beam narrower than the reflecting surfaces of the polygon mirror incident and deflects and causes the light beam to scan.

In this embodiment, in order to control variation in a beam diameter and a quantity of light, which is a problem in adopting the overfilled optical system, as much as possible, a ray is made incident on the polygon mirror from a front direction thereof.

The pre-deflection optical system 7a in this embodiment guides light from the light source 71 to the polygon mirror 80 through an optical path that passes, in the main scanning direction, on an optical axis of the post-deflection optical system A1 (or near the optical axis) and passes (see FIG. 1), in the sub-scanning direction, a position further apart from the optical axis of the post-deflection optical system A1 than all light beams after reflection and deflection guided by the post-deflection optical system A1 (see FIG. 2).

In the pre-deflection optical system 7a, as shown in FIG. 2, the optical path for guiding a light beam from the light source 71 to the polygon mirror 80 is set to be apart from the fold mirror (see FIG. 2), which is an optical element arranged in a position closest to the light source 71 among the optical elements forming the post-reflection optical system A1, by a distance twice or more as large as a diameter of the light beam near the fold mirror.

In such a structure, light emitted from the light source 71 is guided to the reflecting surfaces of the polygon mirror 80 through the finite focus lens 72, the cylinder lens 74, the fθ 1 lens 111, and the fθ 2 lens 112. A light beam reflected and deflected by the reflecting surfaces of the polygon mirror 80 is caused to scan toward the photoconductive surfaces of the photoconductive member through the fθ 1 lens 111 and the fθ 2 lens 112 again.

Second Embodiment

A second embodiment of the invention will be explained.

Figure 3:
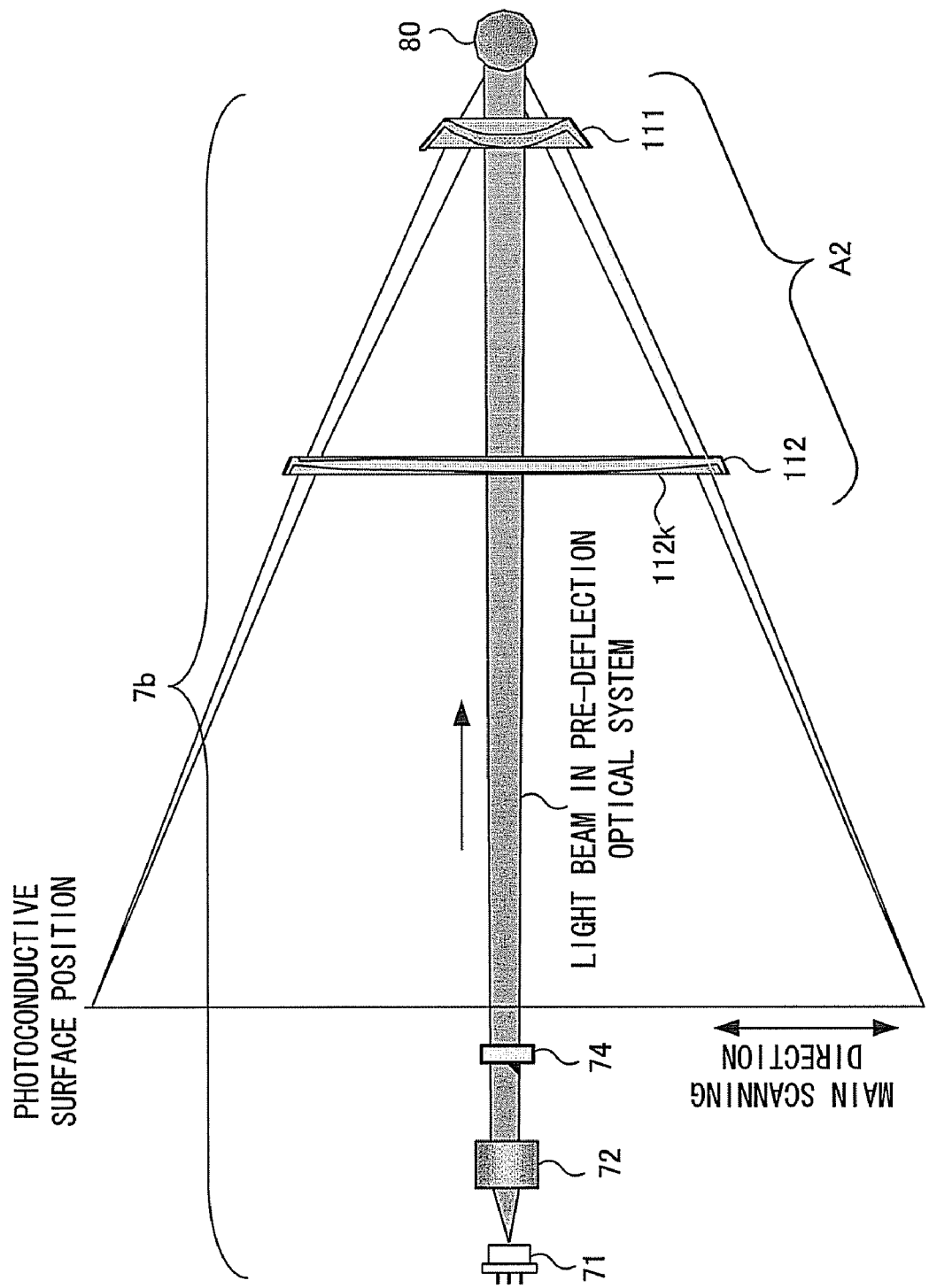
FIG. 3 is a plan view showing a structure of an optical system of an optical beam scanning device according to a second embodiment of the invention in a state in which folding by a fold mirror is developed.

FIG. 3 is a plan view showing a structure of an optical system of an optical beam scanning device according to the second embodiment of the invention in a state in which folding by a fold mirror is developed.

In this embodiment, a diffraction grating is formed on a first surface 112k of the fθ 2 lens 112 among plural optical elements forming a post-deflection optical system A2. The fθ 2 lens 112 in this context is an optical element in which respective light beams, which should be guided to the respective photoconductive members 401y to 401k, are made incident on positions of incidence different from one another in the sub-scanning direction.

In a semiconductor laser, when an environmental temperature fluctuates, a wavelength of light emitted by the semiconductor laser also changes according to this temperature change. The diffraction grating has a characteristic that power also changes according to fluctuation in a wavelength of an incident light and an environmental temperature.

In general, only correction corresponding to a temperature change is possible by simply arranging an optical element without a diffraction grating and a range in which light beams can be corrected is limited. Thus, in this embodiment, the diffraction grating is provided in the fθ 2 lens 112 to widen the range in which light beams can be corrected. It is possible to perform only correction corresponding to "temperature" with the lens alone. However, when the diffraction grating is added, it is also possible to perform correction corresponding to "wavelength". This makes it possible to increase adjustment parameters and improve a degree of freedom of correction.

By adopting such a structure, in addition to the effects realized by the structure in the first embodiment, it is possible to correct fluctuation in an optical characteristic of the scanning optical system due to a temperature change. Further, since the diffraction grating is formed in the existing optical element, the number of components of the optical element is not increased.

The first surface 112k of the fθ 2 lens 112 is equivalent to a plane of incidence of a light beam guided by the pre-deflection optical system 7a and is equivalent to a plane of exit of a light beam guided by the post-deflection optical system 7a.

Third Embodiment

A third embodiment of the invention will be explained.

This embodiment is a modification of the second embodiment.

Figure 4:
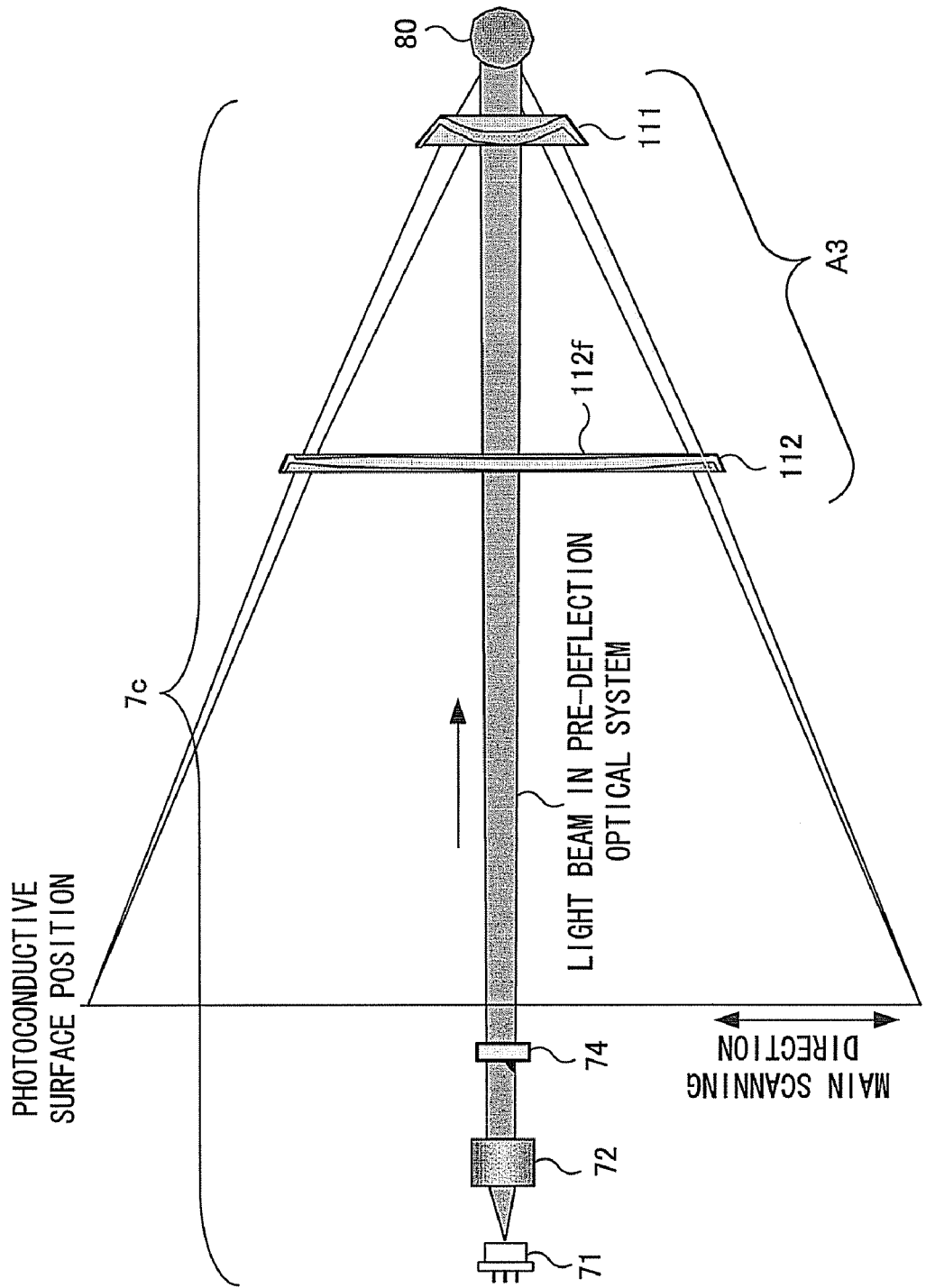
FIG. 4 is a plan view showing a structure of an optical system of an optical beam scanning device according to a third embodiment of the invention in a state in which folding by a fold mirror is developed.

FIG. 4 is a plan view showing a structure of an optical system of an optical beam scanning device according to the third embodiment of the invention in a state in which folding by a fold mirror is developed.

In this embodiment, a diffraction grating is formed on a second surface 112f of the fθ 2 lens 112 among plural optical elements forming a post-deflection optical system A3.

Fourth Embodiment

A fourth embodiment of the invention will be explained.

Figure 5:
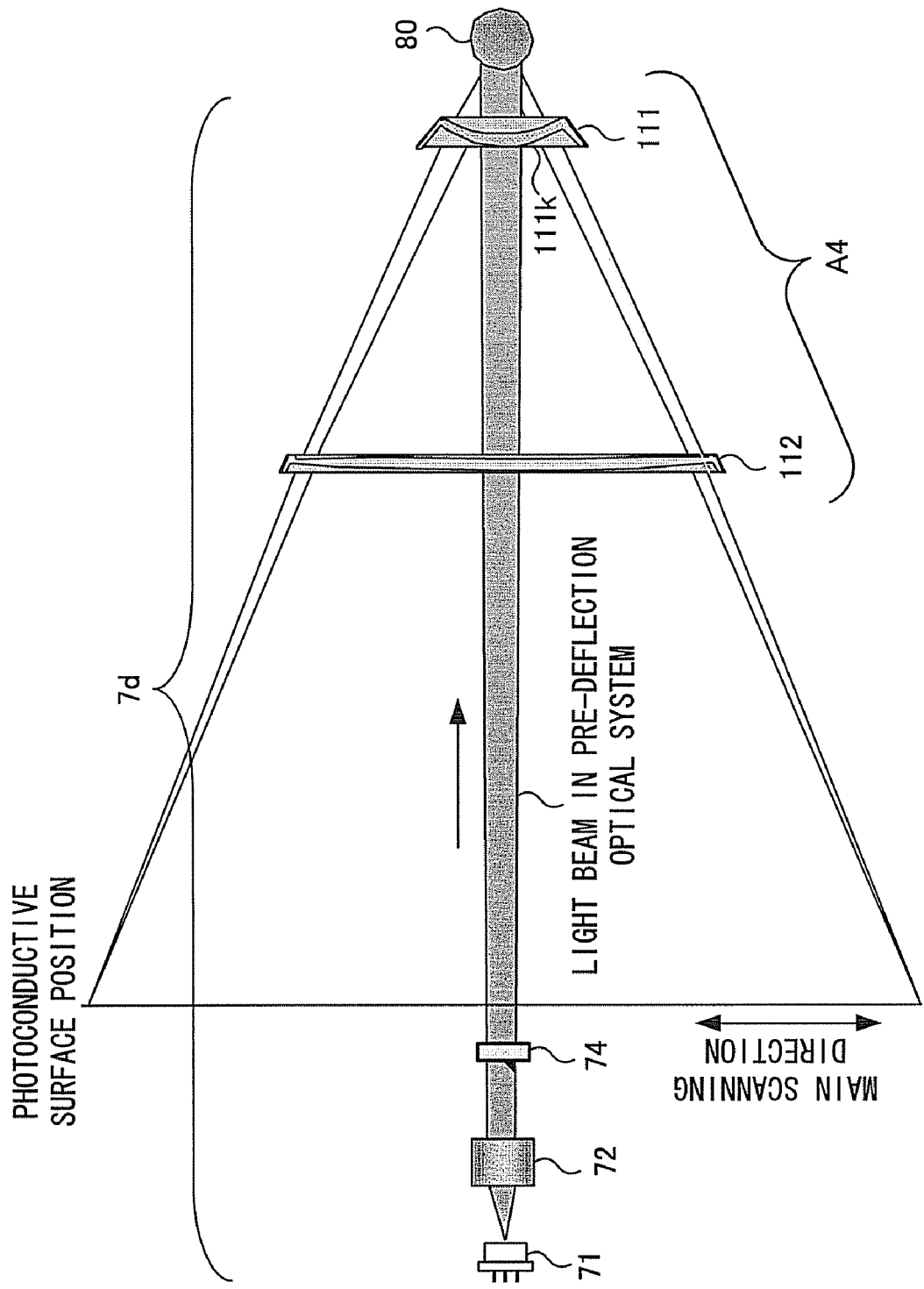
FIG. 5 is a plan view showing a structure of an optical system of an optical beam scanning device according to a fourth embodiment of the invention in a state in which folding by a fold mirror is developed.

FIG. 5 is a plan view showing a structure of an optical system of an optical beam scanning device according to the fourth embodiment of the invention in a state in which folding by a fold mirror is developed.

In this embodiment, a diffraction grating is formed on a first surface 111k of the fθ 1 lens 111 among plural optical elements forming a post-deflection optical system A4. The fθ 1 lens 111 in this context is an optical element in which respective light beams, which should be guided to the respective photoconductive members 401y to 401k, are made incident on positions of incidence different from one another in the sub-scanning direction.

The first surface 111k of the fθ 1 lens 111 is equivalent to a plane of incidence of a light beam guided by the pre-deflection optical system 7a and is equivalent to a plane of exit of a light beam guided by the post-deflection optical system 7a.

Fifth Embodiment

A fifth embodiment of the invention will be explained.

This embodiment is a modification of the fourth embodiment.

Figure 6:
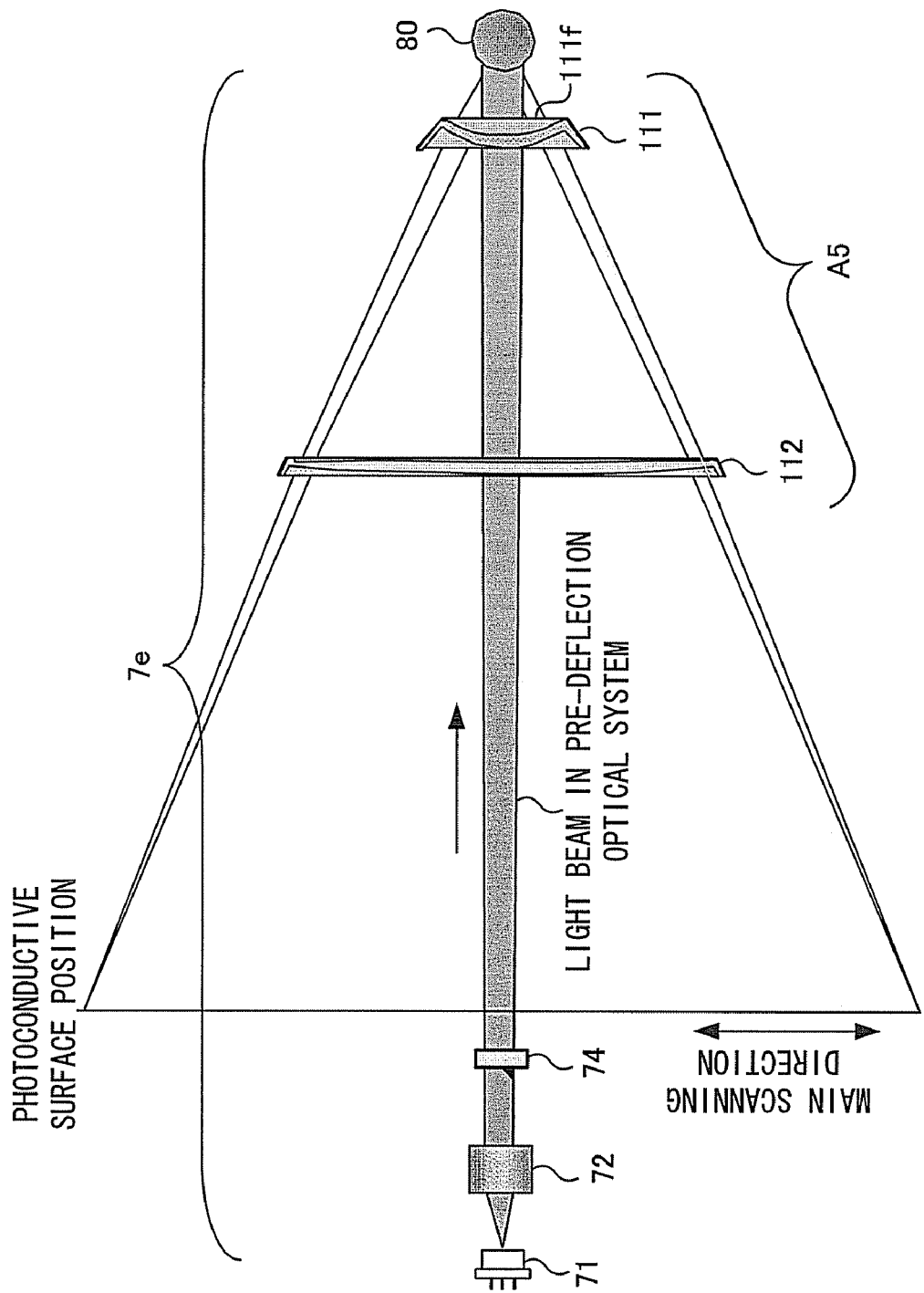
FIG. 6 is a plan view showing a structure of an optical system of an optical beam scanning device according to a fifth embodiment of the invention in a state in which folding by a fold mirror is developed.

FIG. 6 is a plan view showing a structure of an optical system of an optical beam scanning device according to the fifth embodiment of the invention in a state in which folding by a fold mirror is developed.

In this embodiment, a diffraction grating is formed on a second surface 111f of the fθ 1 lens 111 among plural optical elements forming a post-deflection optical system A5.

Sixth Embodiment

A sixth embodiment of the invention will be explained.

Figure 7:
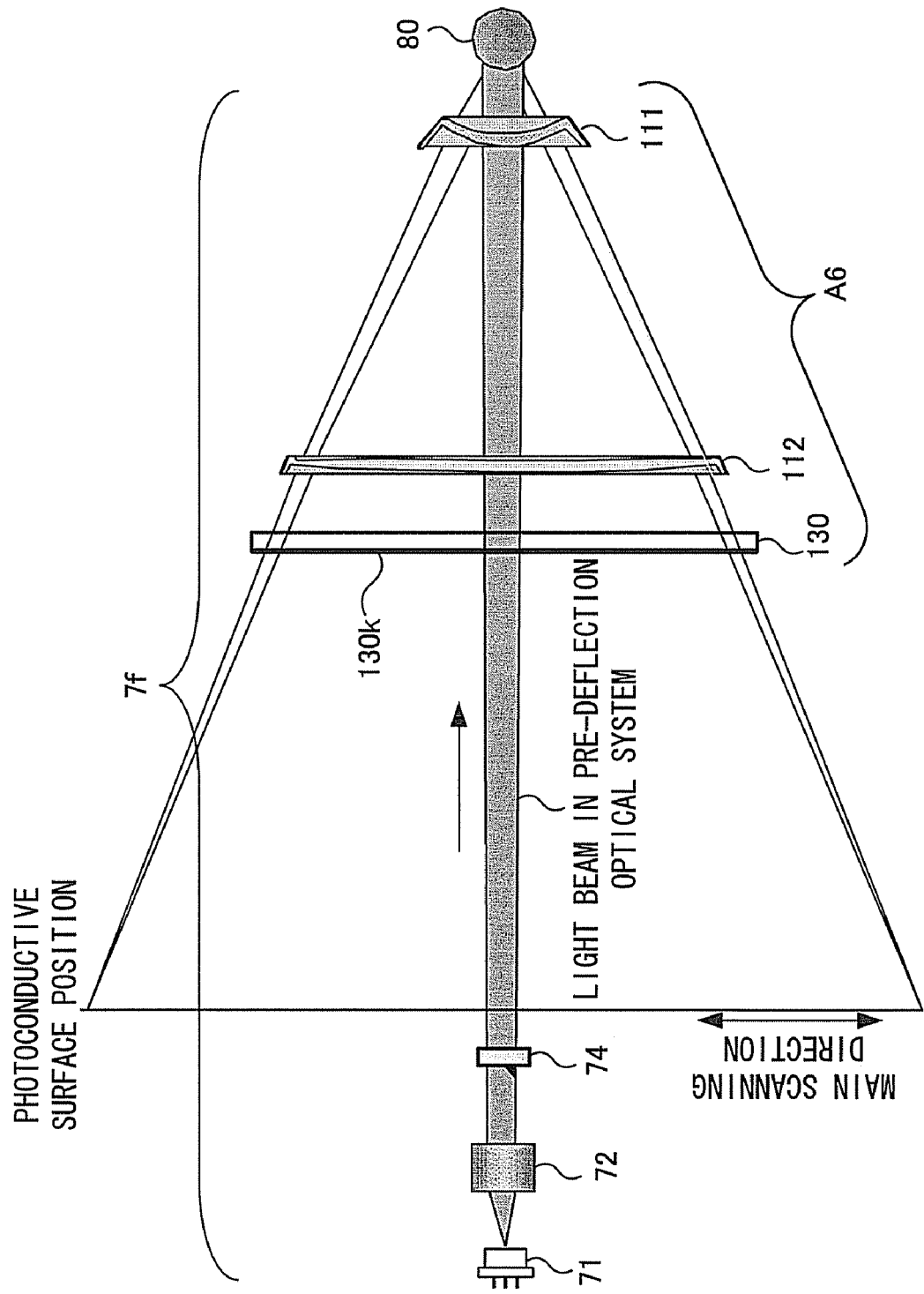
FIG. 7 is a plan view showing a structure of an optical system of an optical beam scanning device according to a sixth embodiment of the invention in a state in which folding by a fold mirror is developed.

FIG. 7 is a plan view showing a structure of an optical system of an optical beam scanning device according to the sixth embodiment of the invention in a state in which folding by a fold mirror is developed.

In this embodiment, a post-deflection optical system A6 has a tabular optical element 130, in which a diffraction grating is formed on a first surface 130k, between the fθ 2 lens 112 and the light source 71 as an optical element having a diffraction grating formed therein.

By arranging the tabular optical element having only power by the diffraction grating in the post-deflection optical system in this way, it is possible to adjust a distance between the diffraction grating and the optical element adjacent to the diffraction grating. Thus, it is possible to realize a more excellent optical characteristic compared with the case in which the diffraction grating is formed in the existing optical element.

Seventh Embodiment

A seventh embodiment of the invention will be explained.

This embodiment is a modification of the sixth embodiment.

Figure 8:
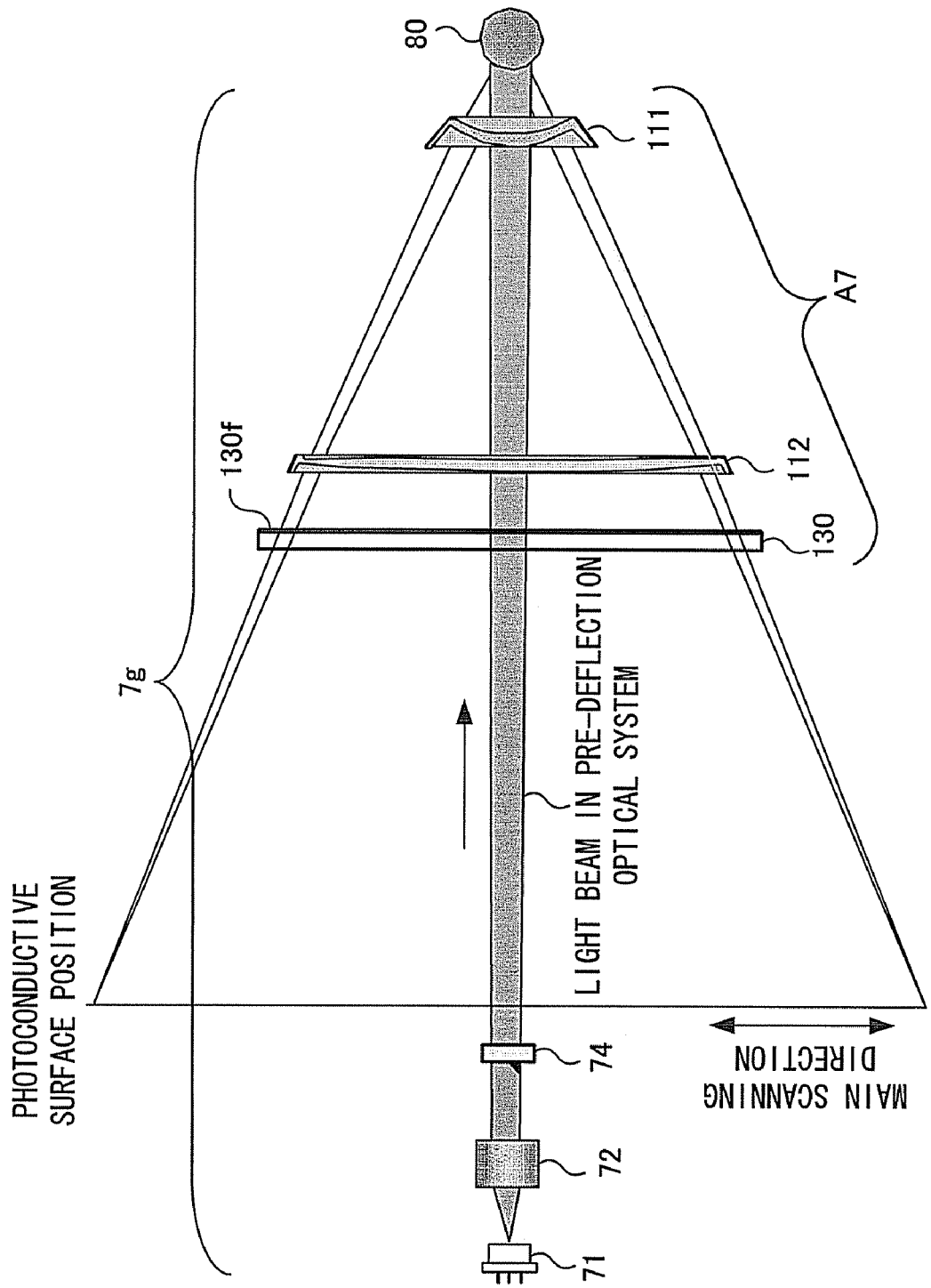
FIG. 8 is a plan view showing a structure of an optical system of an optical beam scanning device according to a seventh embodiment of the invention in a state in which folding by a fold mirror is developed.

FIG. 8 is a plan view showing a structure of an optical system of an optical beam scanning device according to the seventh embodiment of the invention in a state in which folding by a fold mirror is developed.

In this embodiment, a post-deflection optical system A7 has the tabular optical element 130, in which a diffraction grating is formed on a second surface 130f, between the fθ 2 lens 112 and the light source 71 as an optical element having a diffraction grating formed therein.

Eighth Embodiment

An eighth embodiment of the invention will be explained.

Figure 9:
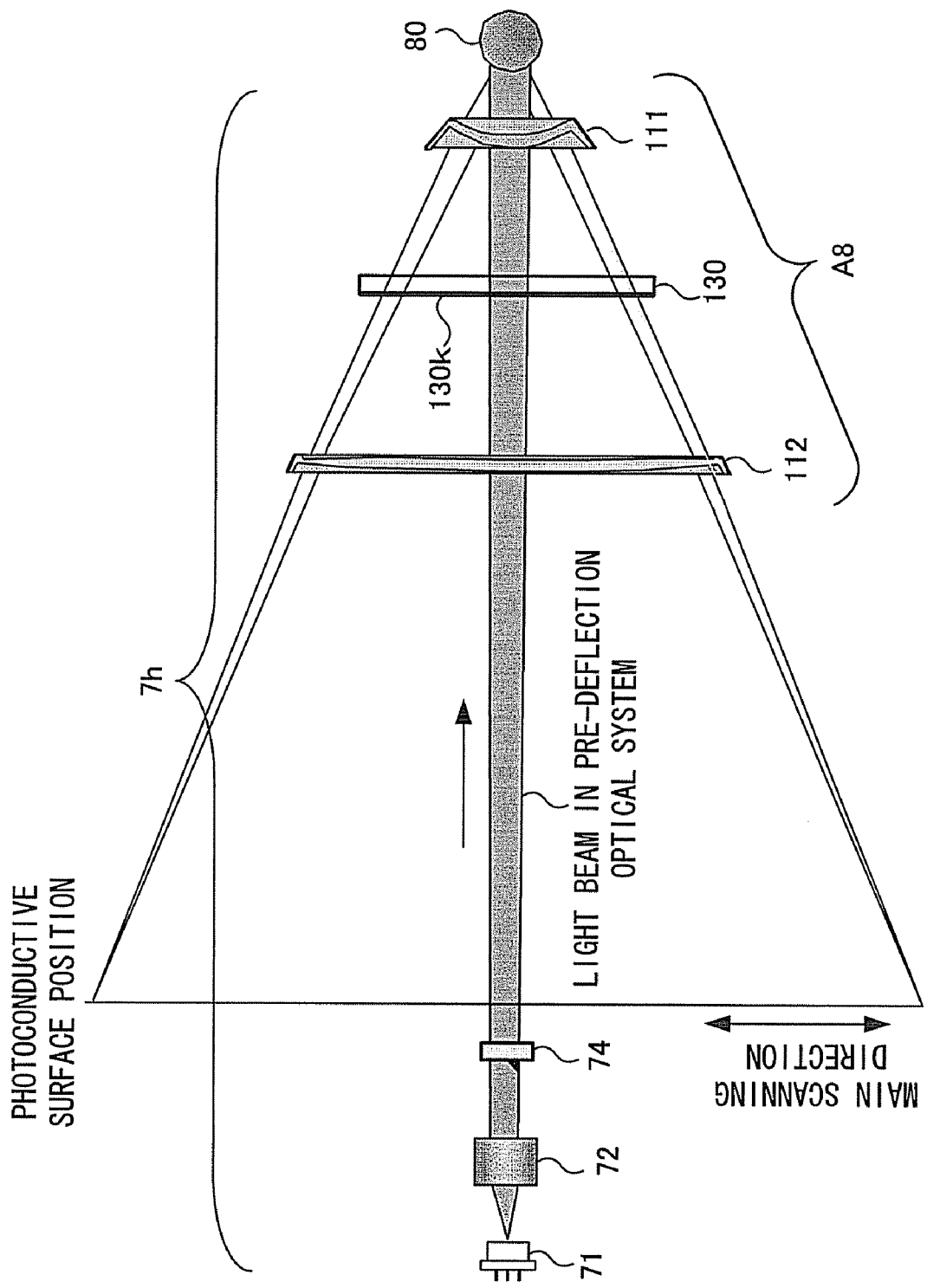
FIG. 9 is a plan view showing a structure of an optical system of an optical beam scanning device according to an eighth embodiment of the invention in a state in which folding by a fold mirror is developed.

FIG. 9 is a plan view showing a structure of an optical system of an optical beam scanning device according to the eighth embodiment of the invention in a state in which folding by a fold mirror is developed.

In this embodiment, a post-deflection optical system A8 has the tabular optical element 130, in which a diffraction grating is formed on the first surface 130k, between the fθ 1 lens 111 and the fθ 2 lens 112 as an optical element having a diffraction grating formed therein.

By arranging the tabular optical element having only power by the diffraction grating in the post-deflection optical system in this way, it is possible to adjust a distance between the diffraction grating and the optical element adjacent to the diffraction grating. Thus, it is possible to realize a more excellent optical characteristic compared with the case in which the diffraction grating is formed in the existing optical element.

Ninth Embodiment

A ninth embodiment of the invention will be explained.

This embodiment is a modification of the eighth embodiment.

Figure 10:
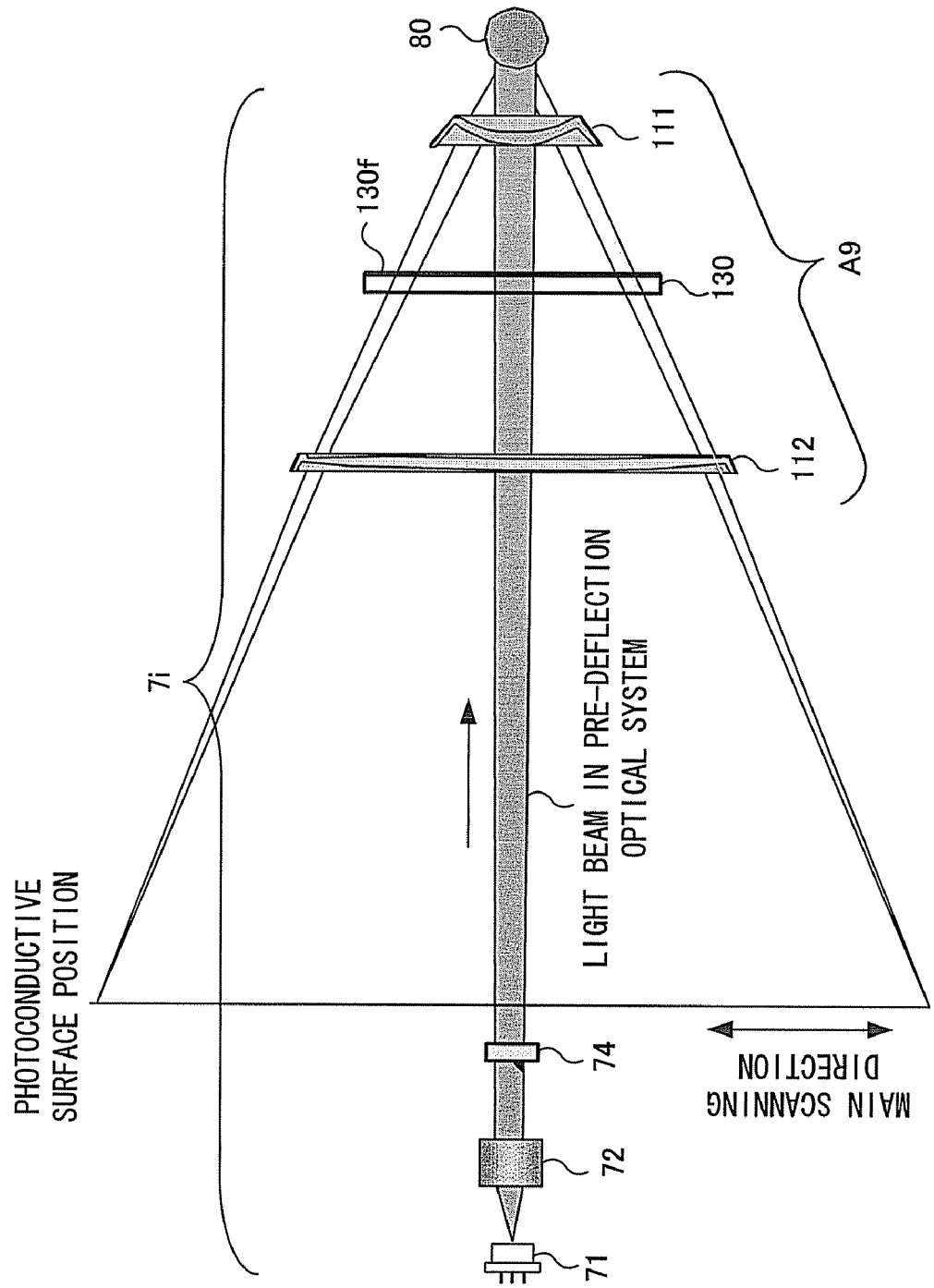
FIG. 10 is a plan view showing a structure of an optical system of an optical beam scanning device according to a ninth embodiment of the invention in a state in which folding by a fold mirror is developed.

FIG. 10 is a plan view showing a structure of an optical system of an optical beam scanning device according to the ninth embodiment of the invention in a state in which folding by a fold mirror is developed.

In this embodiment, a post-deflection optical system A9 has the tabular optical element 130, in which a diffraction grating is formed on the second surface 130f, between the fθ 1 lens 111 and the fθ 2 lens 112 as an optical element having a diffraction grating formed therein.

Tenth Embodiment

A tenth embodiment of the invention will be explained.

Figure 11:
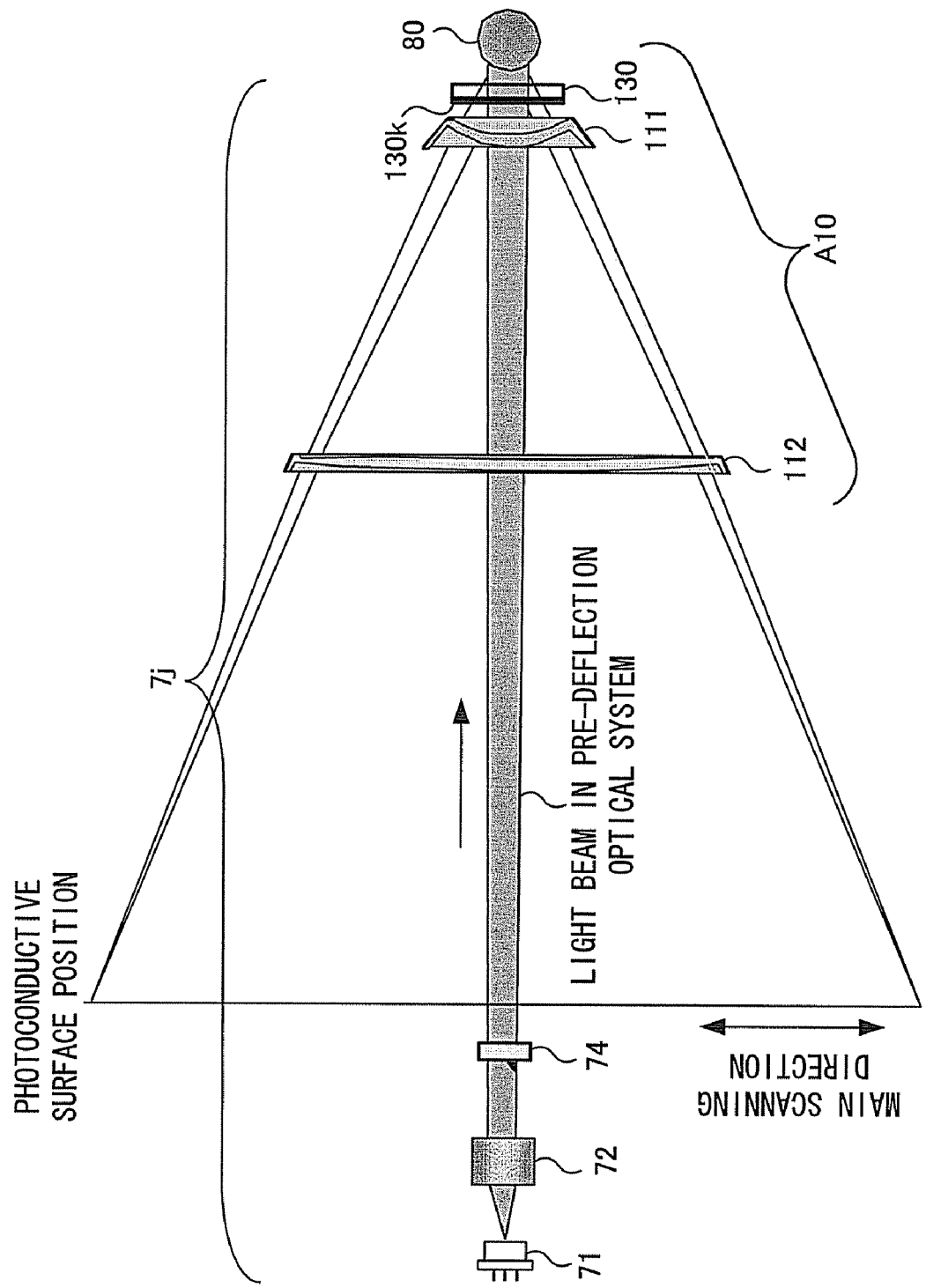
FIG. 11 is a plan view showing a structure of an optical system of an optical beam scanning device according to a tenth embodiment of the invention in a state in which folding by a fold mirror is developed.

FIG. 11 is a plan view showing a structure of an optical system of an optical beam scanning device according to the tenth embodiment of the invention in a state in which folding by a fold mirror is developed.

In this embodiment, a post-deflection optical system A10 has the tabular optical element 130, in which a diffraction grating is formed on the first surface 130k, between the fθ 1 lens 111 and the polygon mirror 80 as an optical element having a diffraction grating formed therein.

By arranging the tabular optical element having only power by the diffraction grating in the post-deflection optical system in this way, it is possible to adjust a distance between the diffraction grating and the optical element adjacent to the diffraction grating. Thus, it is possible to realize a more excellent optical characteristic compared with the case in which the diffraction grating is formed in the existing optical element.

Eleventh Embodiment

An eleventh embodiment of the invention will be explained.

This embodiment is a modification of the tenth embodiment.

Figure 12:
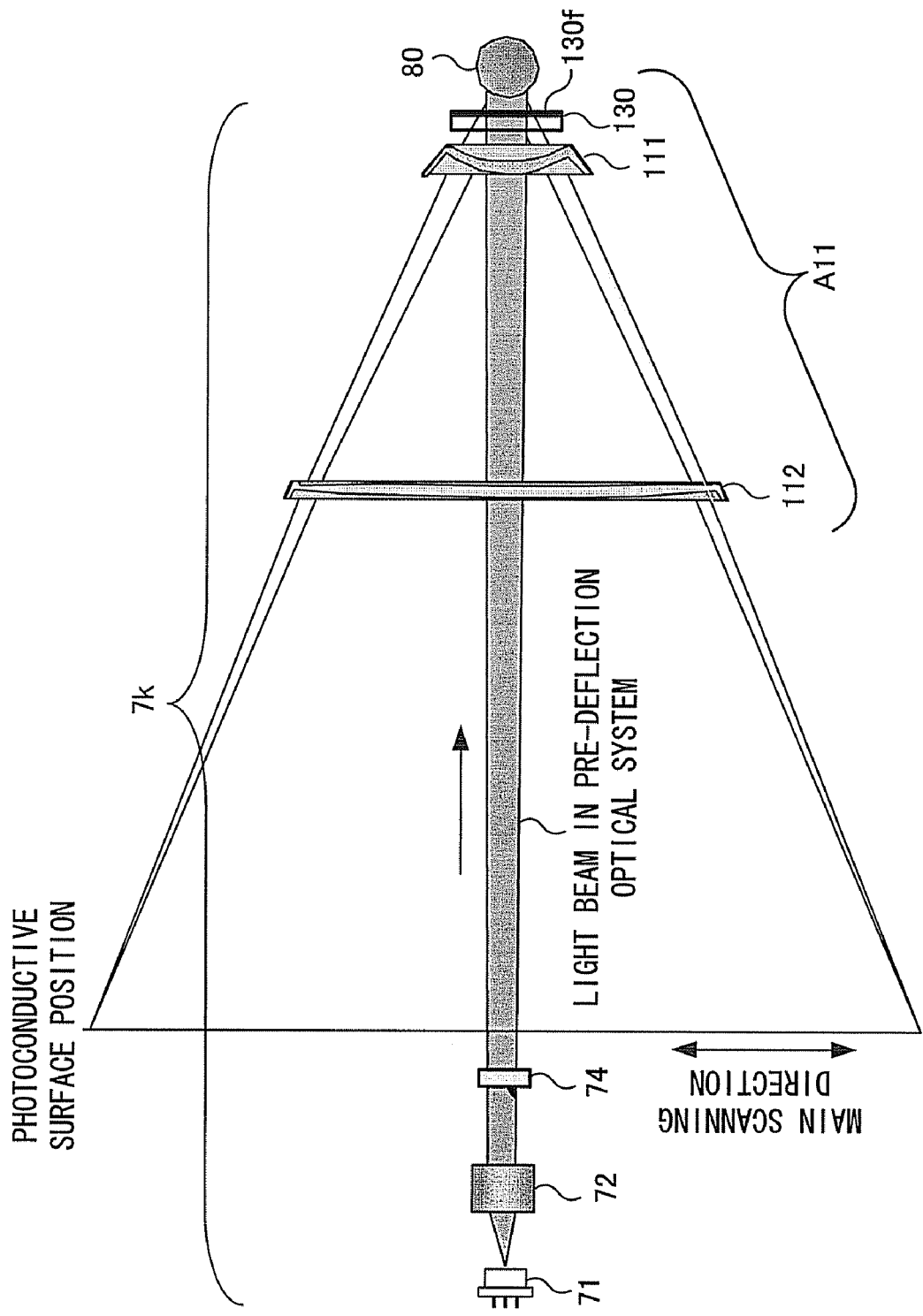
FIG. 12 is a plan view showing a structure of an optical system of an optical beam scanning device according to an eleventh embodiment of the invention in a state in which folding by a fold mirror is developed.

FIG. 12 is a plan view showing a structure of an optical system of an optical beam scanning device according to the eleventh embodiment of the invention in a state in which folding by a fold mirror is developed.

In this embodiment, a post-deflection optical system A11 has the tabular optical element 130, in which a diffraction grating is formed on the second surface 130f, between the fθ 1 lens 111 and the polygon mirror 80 as an optical element having a diffraction grating formed therein.

In the respective embodiments, the structure in which both the light beam guided by the pre-deflection optical system and the light beam guided by the post-deflection optical system pass through the fθ 1 lens ill and the fθ 2 lens 112 is described as the example. However, the invention is not limited to this. At least one of the light beam guided by the pre-deflection optical system and the light beam guided by the post-deflection optical system may pass through at least one of the fθ 1 lens 111 and the fθ 2 lens 112.

Concerning the optical element (e.g., the tabular optical element 130) in which the diffraction grating is formed, similarly, the structure in which both the light beam guided by the pre-deflection optical system and the light beam guided by the post-deflection optical system pass through the diffraction grating is described as an example. However, the invention is not limited to this. At least one of the light beam guided by the pre-deflection optical system and the light beam guided by the post-deflection optical system may pass through the diffraction grating.

In the respective embodiments, the structure in which one optical element having the diffraction grating formed therein is arranged for one optical path of a light beam is described as an example. However, the invention is not limited to this. For example, two optical elements having diffraction gratings formed therein are arranged on an optical path and a diffraction grating having power in the main scanning direction and a diffraction grating having power in the sub-scanning direction are separately formed in the two optical elements. This makes it possible to improve a degree of freedom of adjustment by the diffraction gratings and contribute to improvement of optical performance as well.

In the respective embodiments, the example in which the "multi-beam optical system" is adopted as the light source 71 is described. However, the invention is not limited to this. The invention is also effective in a structure in which an optical system that emits only one light beam from the light source 71 is adopted.

In the respective embodiments, the structure in which the tabular optical element (the optical element having only power by the diffraction grating) having the diffraction grating formed therein is added to the existing optical system. However, the invention is not limited to this. It goes without saying that it is also possible to adopt a structure in which a lens having negative or positive power and having a diffraction grating formed therein is added to an optical system.

As described above, according to the respective embodiments, it is possible to reduce an angular difference in the sub-scanning direction of respective light beams emitted from the polygon mirror corresponding to the respective colors (Y, M, C, and K). Thus, there is an effect that it is possible to reduce an effective angle in the sub-scanning direction of the post-deflection optical system and it is easy to secure uniformity of image surface curves, fθ characteristics, and intervals among the respective colors (when the uniformity is lost, a color drift is caused).

The invention has been explained in detail according to the specific forms. However, it would be obvious for those skilled in the art that various modifications and alterations could be made without departing from the spirit and the scope of the invention.

As described in detail above, according to the invention, it is possible to provide a technique that can contribute to improvement of an optical characteristic of the optical beam scanning device while realizing an increase in scanning speed of a light beam.

What is claimed is:

1. An optical beam scanning device that is capable of causing light from a light source to scan in a main scanning direction on photoconductive surfaces of respective plural photoconductive members, the optical beam scanning device comprising:

a rotating deflector that reflects and deflects an incident light beam with plural reflecting surfaces arrayed in association with the respective plural photoconductive members in a rotating direction to thereby cause the incident light beam to scan in the main scanning direction, tilt angles with respect to a rotation axis of the rotating deflector of the respective plural reflecting surfaces being set to angles corresponding to the photoconductive members associated with the respective reflecting surfaces;

a post-deflection optical system that guides light beams reflected and deflected by the respective plural reflecting surfaces in the rotating deflector to the photoconductive surfaces of the photoconductive members corresponding to the respective reflecting surfaces, wherein the post-deflection optical system includes a shared optical element that gives, according to positions of incidence of the light beams, power to light beams, which should be reflected and deflected by the rotating deflector and guided to the respective plural photoconductive members, such that light beams guided to the photoconductive surfaces by the post-deflection optical system have a predetermined optical characteristic on the photoconductive surfaces, the post-deflection optical system guides, after principal rays of light beams located at both ends in the sub-scanning direction among plural light beams guided by the post-deflection optical system pass the shared optical element, light beams reflected and deflected by the respective plural reflecting surfaces in the rotating deflector to the photoconductive surfaces of the photoconductive member corresponding to the respective reflecting surfaces through optical paths that pass an upper side and a lower side of an optical axis of the shared optical element in the sub-scanning direction, all the respective light beams which should be reflected and deflected by the rotating deflector and guided to the respective plural photoconductive members, pass the shared optical element; and a pre-deflection optical system that shapes the light from the light source to be a light beam of a predetermined sectional shape and guides the light beam to the rotating deflector, the pre-deflection optical system guiding the light from the light source to the rotating deflector through an optical path that passes, in the sub-scanning direction, a position further apart from the optical axis of the post-deflection optical system than all light beams after reflection and deflection guided by the post-deflection optical system.

2. The optical beam scanning device according to claim 1, wherein the pre-deflection optical system guides the light from the light source to the rotating deflector through an optical path that passes, in the main scanning direction, on an optical axis of the post-deflection optical system or near the optical axis.

3. The optical beam scanning device according to claim 1, wherein, in the pre-deflection optical system, an optical path for guiding a light beam from the light source to the rotating deflector is set to be apart from an optical element, which is arranged in a position closest to the light source among optical elements forming the post-reflection optical system, by a distance twice or more as large as a diameter of the light beam.

4. The optical beam scanning device according to claim 1, wherein, among plural optical elements forming the post-deflection optical system, in at least one optical element in which respective light beams, which should be guided to the respective plural photoconductive members, are made incident on positions of incidence different from one another in the sub-scanning direction, a diffraction grating is formed on at least one of a plane of incidence and a plane of exit of the light beams in the optical element.

5. The optical beam scanning device according to claim 4, wherein the post-deflection optical system has, as the optical element having the diffraction grating formed therein, a tabular optical element in which a grating is formed on at least one of a plane of incidence and a plane of exit.

6. The optical beam scanning device according to claim 1, wherein the optical beam scanning device is an optical beam scanning device that is an overfilled optical system.

7. The optical beam scanning device according to claim 1, wherein the pre-deflection optical system shapes the light from the light source to be a light beam of a predetermined sectional shape and guides the light beam to the rotating deflector and condenses the light beam in the sub-scanning direction near the reflecting surfaces of the rotating deflector.

8. An optical beam scanning device that is capable of causing light from a light source to scan in a main scanning direction on photoconductive surfaces of respective plural photoconductive members, the optical beam scanning device comprising:
light beam deflecting means for reflecting and deflecting an incident light beam with plural reflecting surfaces arrayed in association with the respective plural photoconductive members in a rotating direction to thereby cause the incident light beam to scan in the main scanning direction, tilt angles with respect to a rotation axis of the light beam deflecting means of the respective plural reflecting surfaces being set to angles corresponding to the photoconductive members associated with the respective reflecting surfaces;
post-deflection light guiding means for guiding light beams reflected and deflected by the respective plural reflecting surfaces in the light beam deflecting means to the photoconductive surfaces of the photoconductive members corresponding to the respective reflecting surfaces,
the post-deflection light guiding means includes a shared optical element that gives, according to positions of incidence of the light beams, power to light beams, which should be reflected and deflected by the light beam deflecting means and guided to the respective plural photoconductive members, such that light beams guided to the photoconductive surfaces by the post-deflection light guiding means have a predetermined optical characteristic on the photoconductive surfaces,
the post-deflection light guiding means guides, after principal rays of light beams located at both ends in the sub-scanning direction among plural light beams guided by the post-deflection light guiding means pass the shared optical element, light beams reflected and deflected by the respective plural reflecting surfaces in the light beam deflecting means to the photoconductive surfaces of the photoconductive member corresponding to the respective reflecting surfaces through optical paths that pass an upper side and a lower side of an optical axis of the shared optical element in the sub-scanning direction,
all the respective light beams which should be reflected and deflected by the light beam deflecting means and guided to the respective plural photoconductive members, pass the shared optical element; and
pre-deflection light guiding means for shaping the light from the light source to be a light beam of a predetermined sectional shape and guiding the light beam to the light beam deflecting means, the pre-deflection light guiding means guiding the light from the light source to the light beam deflecting means through an optical path that passes, in the sub-scanning direction, a position further apart from the optical axis of the post-deflection light guiding means than all light beams after reflection and deflection guided by the post-deflection light guiding means.

9. An optical beam scanning device according to claim 8, wherein the pre-deflection light guiding means guides the light from the light source to the light beam deflecting means through an optical path that passes, in the main scanning direction, on an optical axis of the post-deflection light guiding means or near the optical axis.

10. An optical beam scanning device according to claim 8, wherein, in the pre-deflection light guiding means, an optical path for guiding a light beam from the light source to the light beam deflecting means is set to be apart from an optical element, which is arranged in a position closest to the light source among optical elements forming the post-reflection light guiding means, by a distance twice or more as large as a diameter of the light beam.

11. An optical beam scanning device according to claim 8, wherein, among plural optical elements forming the post-deflection light guiding means, in at least one optical element in which respective light beams, which should be guided to the respective plural photoconductive members, are made incident on positions of incidence different from one another in the sub-scanning direction, a diffraction grating is formed on at least one of a plane of incidence and a plane of exit of the light beams in the optical element.

12. An optical beam scanning device according to claim 11, wherein the post-deflection light guiding means has, as the optical element having the diffraction grating formed therein, a tabular optical element in which a diffraction grating is formed on at least one of a plane of incidence and a plane of exit.

13. An optical beam scanning device according to claim 8, wherein the optical beam scanning device is an optical beam scanning device that is an overfilled optical system.

14. An optical beam scanning device according to claim 8, wherein the pre-deflection light guiding means shapes the light from the light source to be a light beam of a predetermined sectional shape and guides the light beam to the light beam deflecting means and condenses the light beam in the sub-scanning direction near the reflecting surfaces of the light beam deflecting means.

* * * * *